(12) United States Patent
Kirkup et al.

(10) Patent No.: US 8,838,975 B2
(45) Date of Patent: Sep. 16, 2014

(54) SYSTEM AND METHOD FOR PROTECTING A PASSWORD AGAINST BRUTE FORCE ATTACKS

(75) Inventors: Michael G. Kirkup, Waterloo (CA); Herbert A. Little, Waterloo (CA); Neil P. Adams, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1572 days.

(21) Appl. No.: 11/555,030

(22) Filed: Oct. 31, 2006

(65) Prior Publication Data
US 2008/0120504 A1    May 22, 2008

(51) Int. Cl.
H04L 29/06 (2006.01)

(52) U.S. Cl.
USPC .......................................................... 713/176

(58) Field of Classification Search
USPC .......................................................... 713/176
See application file for complete search history.

(56) References Cited

U.S. PATENT DOCUMENTS

| | | | | |
|---|---|---|---|---|
| 5,420,927 | A * | 5/1995 | Micali | 713/157 |
| 6,084,969 | A * | 7/2000 | Wright et al. | 380/271 |
| 6,192,130 | B1 * | 2/2001 | Otway | 380/277 |
| 6,230,272 | B1 * | 5/2001 | Lockhart et al. | 726/2 |
| 6,510,464 | B1 * | 1/2003 | Grantges et al. | 709/225 |
| 6,718,468 | B1 * | 4/2004 | Challener et al. | 713/184 |
| 6,950,523 | B1 * | 9/2005 | Brickell et al. | 380/286 |
| 2002/0067832 | A1 * | 6/2002 | Jablon | 380/277 |
| 2002/0112168 | A1 * | 8/2002 | Filipi-Martin et al. | 713/183 |
| 2003/0154376 | A1 * | 8/2003 | Hwangbo | 713/173 |
| 2005/0071636 | A1 * | 3/2005 | Lee et al. | 713/170 |
| 2008/0120504 | A1 * | 5/2008 | Kirkup et al. | 713/176 |

FOREIGN PATENT DOCUMENTS

| | | |
|---|---|---|
| CA | 2566253 A1 | 4/2008 |
| CA | 2566253 C | 8/2012 |

OTHER PUBLICATIONS

"Design of secure communications network system based on data encryption and digital signature" Taiping Mo ; Jianhua Wang ; Wei Mo High Performance Computing and Simulation (HPCS), 2011 International Conference on Digital Object Identifier.*
Bellovin, Steven M., and Michael Merritt. "Augmented encrypted key exchange: a password-based protocol secure against dictionary attacks and password file compromise." Proceedings of the 1st ACM conference on Computer and communications security. ACM, 1993.*

(Continued)

Primary Examiner — Harris Wang
(74) Attorney, Agent, or Firm — Bereskin & Parr LLP/S.E.N.C.R.L., s.r.l.

(57) ABSTRACT

In a system and method for authenticating a client device by an authentication device, the client device user is assigned a PIN generated by the authentication device. The user provides the PIN and a password to the client device, from which the client device generates a symmetric key and further generates a public/private key pair. The private key is encrypted using the symmetric key and stored in encrypted form only. The public key and a message authentication code generated from the PIN are provided to the authentication device, which stores the public key. Subsequently, when the user seeks to be authenticated, the user enters a password at the client device, which is used to generate a symmetric key to decrypt the encrypted private key. A message to the authentication device is signed using the resultant value. The authentication device uses the public key to verify the signature of the message.

23 Claims, 4 Drawing Sheets

(56) References Cited

OTHER PUBLICATIONS

Canadian Office Action. Canadian Application No. 2,566,253. Dated: Apr. 12, 2010.

Canadian Office Action. Canadian Application No. 2,566,253. Dated: Nov. 1, 2011.

Communication on Canadian Application No. 2,566,253. Dated: Jun. 13, 2012.

* cited by examiner

SYSTEM AND METHOD FOR PROTECTING A PASSWORD AGAINST BRUTE FORCE ATTACKS

TECHNICAL BACKGROUND

1. Technical Field

This invention relates generally to password authentication of a user, and specifically to a system and method for verification of a password by a signing authority while protecting the password from malicious users.

2. Description of the Related Art

When a user seeks to be authenticated and registered by a signing or certification authority, typically the user must provide initial authentication data to the authority. Such authentication data often comprises at least a password or a personal identification number (PIN), and preferably both. As is known in the art, when a user seeks authentication, the user enters the password or PIN at a client machine, which transmits the authentication data to the authenticating server for verification. If the authentication data is verified, then the user is authenticated by the server and can then be registered by the signing authority.

Because the user must submit a password or PIN in order to be authenticated, there is the potential that the authentication data may be intercepted by a malicious user if the communications between the user and the authenticating server are intercepted. Even if the authentication data is hashed, there is a risk that a malicious user, in possession of the hashed information, may launch a brute force attack in order to guess the password or PIN.

While it is known to configure a server to disable login or authentication attempts after a predetermined number of failed attempts, it is desirable to provide a system and method that further discourages brute force attacks on an authentication server. It is further desirable to provide a system and method for authenticating a user that does not require the transmission of authentication data either in the clear or in a hashed form.

BRIEF DESCRIPTION OF THE DRAWINGS

In drawings which illustrate by way of example only a preferred embodiment of the invention.

DETAILED DESCRIPTION OF THE PREFERRED EMBODIMENT

Figure 1:
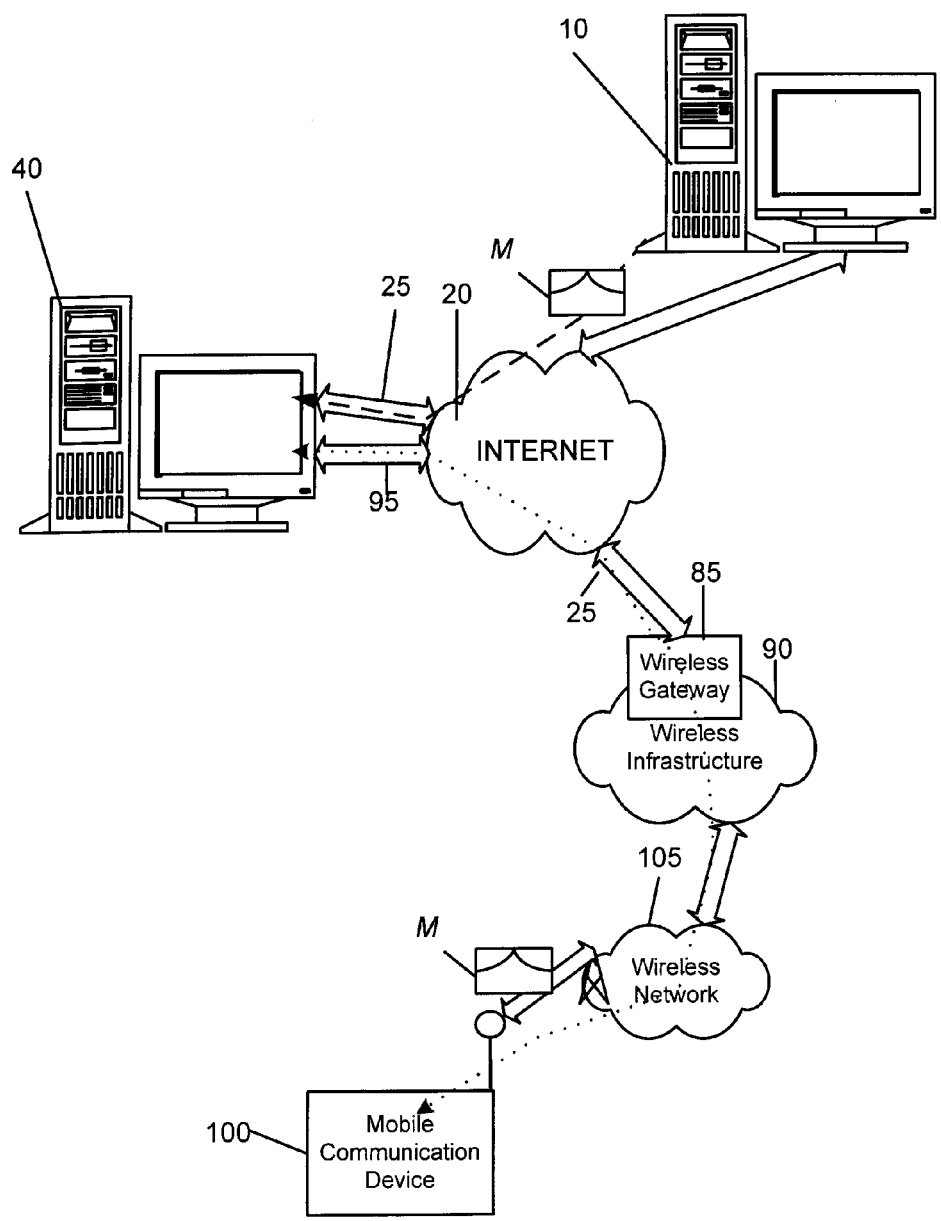
FIG. 1 is a schematic representation of a network topology employing the system and method for authenticating a user.

Referring to FIG. 1, a simplified exemplary network topology supporting an embodiment of the invention is shown. One skilled in the art will appreciate that there may be hundreds of different topologies, and that the simple system shown in FIG. 1 is for illustrative purposes only. There may be many communications devices connected to the system, that are not shown in the simple overview of FIG. 1. Those skilled in the art will appreciate that the system and method described below may be adapted for use with a plurality of communications devices.

FIG. 1 shows client device or devices 10 and 100 for use by a user seeking to be authenticated by an authentication device 40, hereinafter referred to as an authentication server 40 or server 40, preferably managed by an authentication authority, the Internet 20, a wireless gateway 85, wireless infrastructure 90, and a wireless network 105. The client device 10 or 100 may be a personal computer 10 or other communication device such as a mobile communication device 100, and is preferably configured to send and receive e-mail messages and to encrypt and digitally sign such messages using S/MIME or other protocols, as well as to send and receive messages employing other protocols, such as Hypertext Transfer Protocol (HTTP). In particular, the client device 10 or 100 is preferably configured to transmit and receive HTTP messages to and from the authentication server 40. The client device 10 or 100 may be connected to an ISP (Internet Service Provider) on which the user has an account, or located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1. It will be appreciated that the devices referred to herein as communication devices or client devices may comprise devices whose main function is directed to data or voice communication over a network, but may also be provided with personal or productivity applications, or devices whose main function is directed to computing or executing productivity applications, but are also adapted to enable a user to communicate over a network.

The wireless gateway 85 and infrastructure 90 provide a link between the Internet 20 and wireless network 105. The wireless infrastructure 90 determines the most likely network for locating a given user and tracks the user as they roam between countries or networks. Messages and other data may be delivered to the mobile device 100 via wireless transmission, typically at a radio frequency (RF), from a base station in the wireless network 105 to the mobile device 100. The particular network 105 may be any wireless network over which messages may be exchanged with a mobile communication device. The mobile device 100 may also receive data by other means, for example through a direct connection to a port provided on the mobile device 100, such as a Universal Serial Bus (USB) link.

The authentication server 40 may be implemented, for example, on a network computer within the firewall of a corporation, a computer within an ISP or ASP system or the like, and is configured to receive HTTP requests from the client device 10 or 100 and to transmit HTTP messages in response to the client device 10 or 100. The authentication server 40 may be provided within a corporate firewall in the network shown in FIG. 1, or may operate outside a corporate firewall and be connected to the Internet 20 or other network.

The authentication server 40 may act as an application, network access, and/or file server for one or more communication devices. As can be seen from the following description, the server 40 may be used to provide administrative functions for the communication devices 10 and 100, for example by establishing and transmitting information technology (IT) policies. The authentication server 40 may also act as a message server for the client devices 10 and 100. The client device 10 or 100, if it is configured for receiving and possibly sending e-mail, will in that case normally be associated with an account on the server 40. The software products and other components that are often used in conjunction with the functions of the server 40 described herein are not shown in FIG. 1, as they do not directly play a role in the system and method described below. If the server 40 acts as a message server, the server 40 may support either a so-called "pull" or "push" message access scheme, wherein the mobile device 100 must request that stored messages be forwarded by the message server to the mobile device 100, or the server 40 may be provided with means for automatically redirecting messages addressed to the user of the mobile device 100 as they are received, respectively.

Referring again to FIG. 1, regardless of the specific mechanism controlling the forwarding of messages to the mobile device 100, the wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

The server 40 is preferably configured to execute decryption algorithms and digital signature verification algorithms; the client device 10 or 100 is preferably configured to execute encryption and decryption algorithms, and digital signature and verification algorithms, preferably employing private and/or public keys. E-mail transmitted by the client device 10 or 100 may be sent fully in the clear, using traditional Simple Mail Transfer Protocol (SMTP), RFC2822 headers and Multipurpose Internet Mail Extension (MIME) body parts to define the format of the mail message, or may be encrypted or digitally signed. These techniques are all well known to those skilled in the art. If the message is digitally signed, then the user would preferably be authenticated and registered by a signing or certification authority in order to receive a digital certificate for use in signing electronic messages, such as those known in the art. A system for providing a client device 10 or 100 with the means for providing authentication information to a certification authority by authenticating with the server 40 is described as follows.

As shown in FIG. 1, an electronic message M may be sent from the client device 10 or 100. This message M may comprise a HTTP request from the client device 10 or 100 to the server 40 for data, and, as will be appreciated from the authentication method described below, may comprise a digitally signed message for verification by the server 40.

Preferably, a user of a client device 10 or 100 is authenticated by the authentication server 40. The preferred embodiment of this authentication method is described with reference to FIG. 2. However, prior to authentication, in accordance with the preferred embodiment, a public key is provided to the authentication server by the client device 10 or 100. The preferred method of providing the public key is described with reference to FIG. 3.

Prior to authentication of the client device 10 or 100 by the authentication server 40, in a preferred embodiment a separate piece of authentication data, such as a PIN or other shared secret value, is provided to the user of the client device 10 or 100. (For ease of reference the authentication data is referred to as a PIN in the following description.) This step is illustrated as step 120 in FIG. 3. The PIN is also made accessible to the authentication server 40; for example, the authentication server 40 may create the PIN, as shown at step 110. This PIN is preferably provided to the user "out of band"; that is, using a method that is less vulnerable to interception than electronic correspondence. For example, the PIN may be generated by the authentication server 40 and provided by the server 40 to an administrator, who preferably verifies the identity of the user of the client device 10 or 100 before providing the PIN to the user in direct conversation, verbally over the telephone, or in another manner by which the user personally must receive the PIN rather than via the client device 10 or 100. All such suitable methods of transmitting the PIN to the user of the client device 10 or 100, and from the user to the client device 10 or 100, are represented at step 120. In a further embodiment, if the authentication server 40 does not first generate the PIN, then in place of step 110 of FIG. 3 the authentication server 40 would be provided with the PIN in a separate step. The PIN may be provided to the client device 10 or 100 at any time prior to step 180, described below. The authenticating server 40 and the client device 10 or 100 preferably agree on the encryption algorithms to be employed during the processes described below. For example, the authenticating server 40 may transmit a set of IT policies to the client device 10 or 100 during an initiation phase comprising a list of acceptable encryption standards; the client device 10 or 100 may be configured to select a standard that is available to the client device 10 or 100 and respond to the authenticating server 40 with that selection. Other means of defining the applicable encrypting standards will be known to those skilled in the art.

Furthermore, a private/public key pair ($K_{priv}$ and $K_{pub}$) and authentication information, such as a password P, is created for the client device 10 or 100. While the authentication information may comprise a personal identification number or other identifier that is not a password, the authentication information in the method described below shall be described in the context of a password P. The private key $K_{priv}$ and the public key $K_{pub}$ are preferably created by executing an algorithm on the client device 10 or 100 itself at step 130. The password P may be selected by the user of the client device 10 or 100 at step 140, although P may be assigned by a signing authority or other source. It will be appreciated that the selection of the password P may take place before the generation of the key pair at step 130.

Once the user has chosen or been assigned a password P and the private/public key pair $K_{priv}$, $K_{pub}$ has been generated at the client device 10 or 100, the password P is then used to create a symmetric key $K_s(P)$ at step 150, preferably in accordance with a public key cryptography standard such as PKCS#5 published by RSA Data Security, Inc., although other suitable public key cryptography standards may be used. The password P may be provided to the client device 10 or 100 prior to or following the creation of the private/public key pair $K_{priv}$, $K_{pub}$, for example during a user authentication step in which the user enters the password at the client device 10 or 100; the password P is preferably stored in a volatile memory store at the client device 10 or 100, and not written to non-volatile memory.

The symmetric key $K_s(P)$ is then used by the client device 10 or 100 to encrypt the private key $K_{priv}$ to yield $E_{Kpriv}=\text{encrypt}(K_s(P), K_{priv})$, where the encryption function is a suitably chosen function known in the art, at step 160. In the preferred embodiment, an algorithm such as RC4® by RSA Data Security, Inc. may be used. The private key $K_{priv}$ is thus stored at the client device 10 or 100 in encrypted form $E_{Kpriv}$ only at step 170, although the algorithm for generating a symmetric key from a value such as the password P is stored at the client device 10 or 100. Any copies of unencrypted private key $K_{priv}$ resident in memory at the client device are destroyed after $E_{Kpriv}$ is stored.

The PIN itself is entered by the user at the client device 10 or 100, in response to a prompt. Preferably, instead of transmitting the PIN directly to the authentication server 40, the client device 10 or 100 generates a message authentication code (MAC) based on the PIN using methods known in the art. The public key $K_{pub}$ is then transmitted with the message authentication code from the client device 10 or 100 to the authentication server 40 at step 180. The client device 10 or 100 may provide the public key $K_{pub}$ and the message authentication code to the server 40 prior to a specific request for authorization or certification in accordance with the method described below, with reference to FIG. 2. The public key $K_{pub}$ and message authentication code are received by the authentication server 40; using techniques known in the art, at step 185 the message authentication code is verified by the authentication server 40, which was already provided with the shared secret PIN as described above. The authentication server 40 then stores $K_{pub}$ at step 190 in association with an indicator corresponding to the user of the client device 10 or 100. The indicator may comprise a network address or e-mail address corresponding to the user of the client device 10 or 100, or another suitable indicator. The data may be stored in memory located at the authentication server 40, or alternatively in a memory store accessible to the authentication server 40. The message comprising the public key $K_{pub}$ is preferably hashed and digitally signed with $K_{priv}$ using techniques known in the art, such that the authentication server 40, upon receipt of the message, can verify that the $K_{pub}$ received is a valid public key at step 185 prior to storing the public key $K_{pub}$ at step 190.

Thus, in accordance with the preferred embodiment, when the private/public key pair is generated, only the private key $K_{priv}$ in encrypted form is stored at the client device 10 or 100, and the user's password P is not stored at the client device 10 or 100 except in volatile memory when the user is authenticated to the client device 10 or 100.

Figure 2:
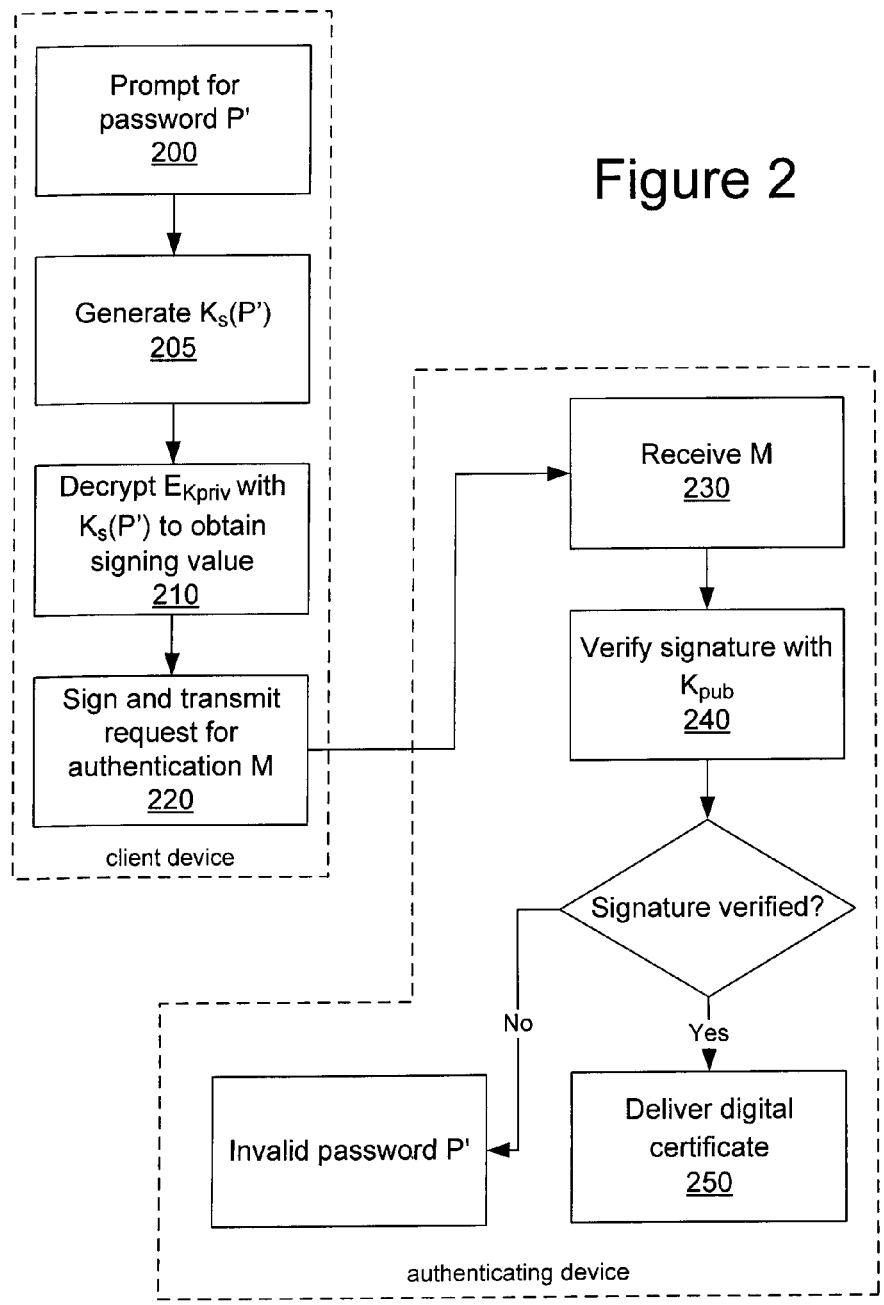
FIG. 2 is a flowchart for an embodiment of a method of transmitting authentication data to an authentication server.
Figure 3:
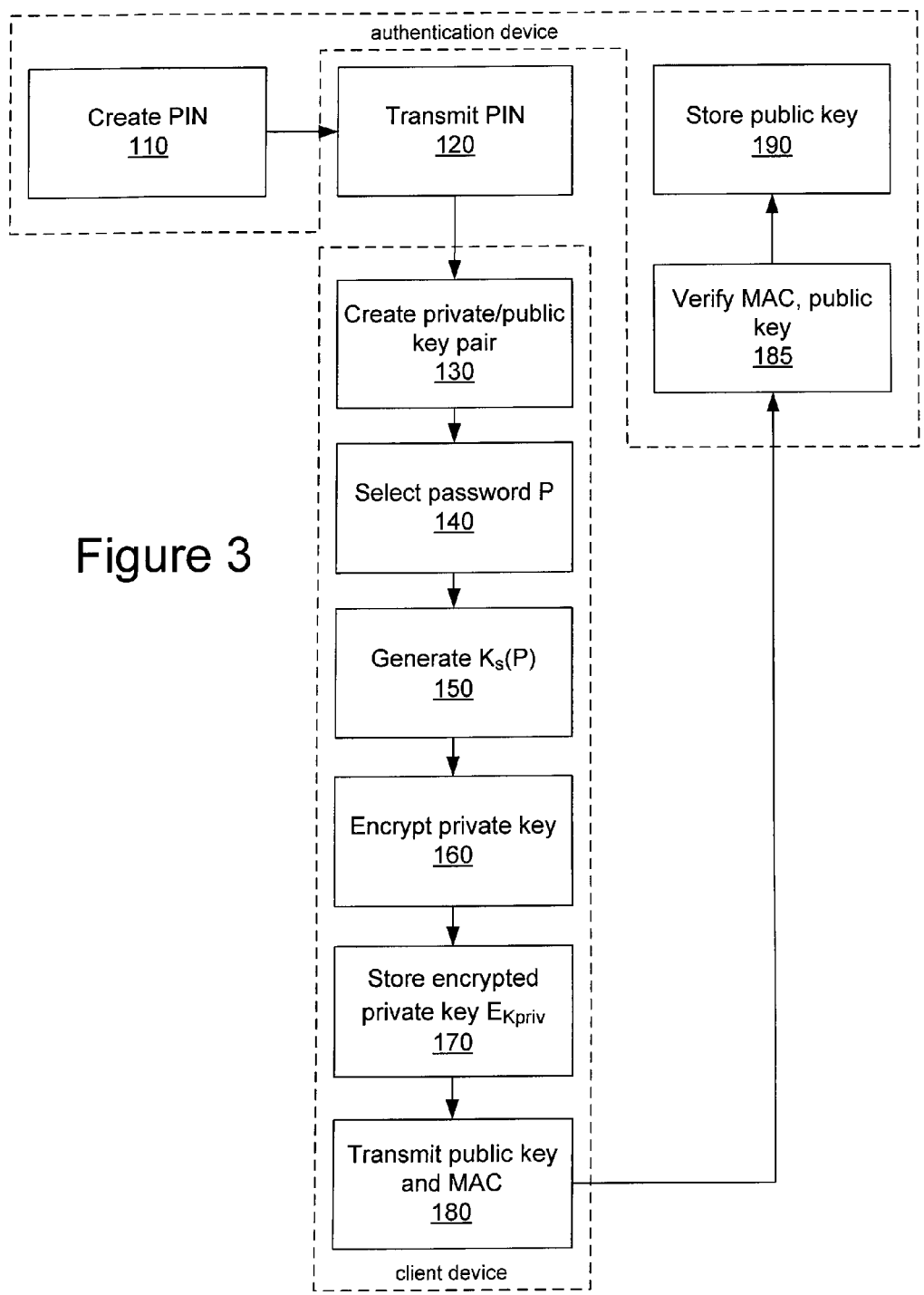
FIG. 3 is a flowchart for an embodiment of a method of transmitting a public key to an authentication server.

Referring to FIG. 2, a preferred method for authenticating a user of the client device 10 or 100 by the authentication server 40 is shown. When authentication by the server 40 is desired, a request for authentication is transmitted to the server 40 at step 220, for example in a HTTP request. The request for authentication preferably comprises a message M, which is preferably composed as follows: the user, if not previously prompted to do so, is prompted to input a password, P', at step 200. This password, if correct, would match the password P that had been previously selected or assigned at step 140, but the value of P' cannot be verified directly against P, since P is not stored at the client device 10 or 100 or at the server 40. Rather, the client device 10 or 100 generates a symmetric key $K_s(P')$ at step 205, using the same algorithm used to generate the initial symmetric key $K_s(P)$. This symmetric key $K_s(P')$ is used to decrypt the previously stored value $E_{Kpriv}$ at step 210 to obtain a signing value, the decrypted private key $K_{priv}'$. A message M is then digitally signed using the signing value $K_{priv}'$ at step 215, then transmitted to the server 40 at step 220. The message M itself may comprise a blank message, or preferably a predetermined message, for example a message comprising a nonce or randomly generated string provided by the authentication server 40, which is used only once by the authentication server 40 for the purpose of authenticating a user.

At the authentication server 40, once the message M is received at step 230 the digital signature is verified using the public key $K_{pub}$ available at the server 40 at step 240. If necessary, the server 40 may retrieve the public key $K_{pub}$ from a memory store external to the server itself. If the server 40 verifies the signature, then it is determined that password entered by the user, P', matched the original password P and the user is authenticated. If the server 40 cannot verify the signature using the public key $K_{pub}$, then the failure to verify the signature indicates that an incorrect password was input by the user at the client device 10 or 100, and an error message may be returned by the server 30 to the client device 10 or 100. In a further embodiment, upon a failure to verify the signature the user of the client device 10 or 100 may be required to re-establish a new private/public key pair as described with reference to FIG. 3. This re-establishment procedure may be invoked upon the occurrence of an event defined by IT policies, for example after the user has made a set number of attempts to enter the correct password P', or if the server 40 determines that it does not have access to a public key $K_{pub}$ corresponding to that user.

Thus, the password input by the user for the purpose of authentication is never transmitted from the client device 10 or 100 to the authentication server 40, and the need to store the password P in the clear or hashed at either the client device 10 or 100 or at the authentication server 40 is eliminated. However, by means of the method described above, the user of the client device 10 or 100 is still capable of being authenticated to a signing authority or certification authority operating or operating in conjunction with the authentication server 40 with a sufficient degree of confidence through the verification of a user-inputted password P'. In particular, when the password and private/public key pair is used in conjunction with a separate PIN or other piece of authentication data assigned to the individual user and used to generate a message authentication code, the signing authority is provided with reasonable assurance that the party inputting the password P', which is then verified by the method described with reference to FIG. 2, is the same party operating the client device 10 or 100 who was provided with the PIN. Thus, the preceding authentication method may be used to authenticate a user who is requesting, for example, a digital certificate to be delivered from the signing authority or certification authority for use on the client device 10 or 100. Once the user is authenticated through the authentication server 40 as described above, the signing or certification authority may cause the requested digital certificate to be transmitted to the user (e.g. FIG. 2, 250). In the circumstance where the message M is intercepted by a malicious user, the malicious user would not gain access to the password P. If the message M comprises a nonce or other randomly generated string and is used in a replay attack against the authentication server 40, the authentication server 40 may be configured to refuse a subsequent authentication based on the replay attack. Further, in the preferred embodiment the client device 10 or 100 is also secure from a brute force attack; as $K_{priv}$ is stored in encrypted form on the client device 10 or 100, it is not possible for an attacker in possession of the client device 10 or 100 to determine whether it is in possession of the correct $K_{priv}$.

As will be appreciated by those skilled in the art, the communication from the client device 10 or 100 to the authentication server 40 may employ conventional messaging techniques, alone or in combination with specialized software installed on the client device 10 or 100 for communicating with the authentication server 40 without invoking an electronic mail client application on the client device 10 or 100. This specialized software may comprise algorithms for generating a private/public key pair and a symmetric key. In the preferred embodiment, the public and private keys may be generated and the digital signature of the signed message M verified using a digital signature algorithm, for example the Digital Signal Standard published by the National Institute of Standards and Technology (NIST) as Federal Information Processing Standards Publication (FIPS) 186-2, 2000 Jan. 27. However, other known methods of generating public/private key pairs may be employed, in which case the verification step 240 will employ a suitable technique for verifying the signature of the message M.

Figure 4:
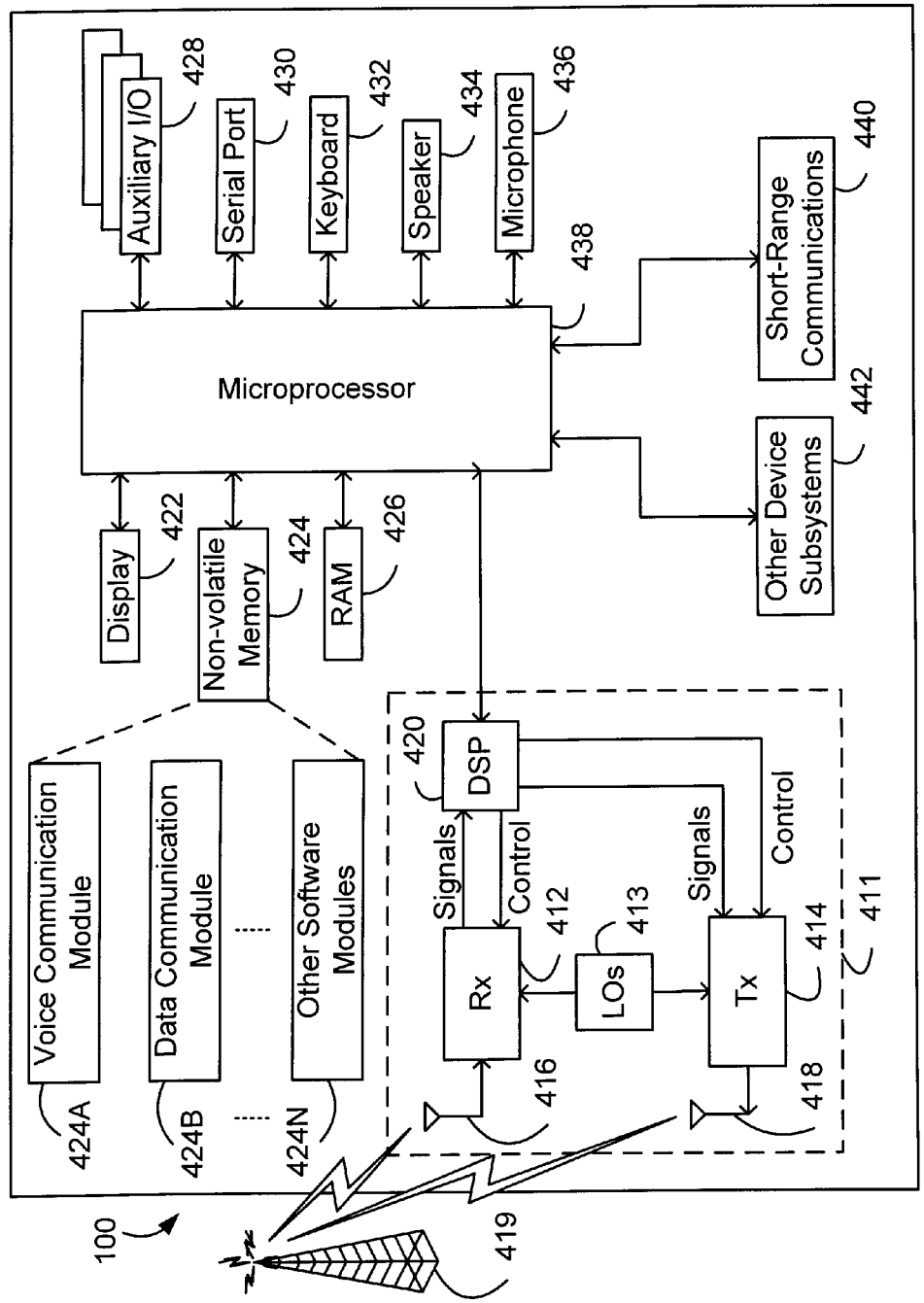
FIG. 4 is a schematic representation of a mobile communication device employing the system and method for authenticating a user.

As noted above, the systems and methods disclosed herein may be used with many different computers and devices, such as a wireless mobile communications device shown in FIG. 4. With reference to FIG. 4, the mobile device 100 is a dual-mode mobile device and includes a transceiver 411, a microprocessor 438, a display 422, non-volatile memory 424, random access memory (RAM) 426, one or more auxiliary input/output (I/O) devices 428, a serial port 430, a keyboard 432, a speaker 434, a microphone 436, a short-range wireless communications sub-system 440, and other device sub-systems 442.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 4 by the communication tower 419. These voice and data networks may be separate communication networks using separate infrastructure, such as base stations, network controllers, etc., or they may be integrated into a single wireless network.

The transceiver 411 is used to communicate with the network 419, and includes the receiver 412, the transmitter 414, the one or more local oscillators 413 and the DSP 420. The DSP 420 is used to send and receive signals to and from the transceivers 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 411 via a link between the DSP 420 and the microprocessor 438.

The detailed design of the transceiver 411, such as frequency band, component selection, power level, etc., will be dependent upon the communication network 419 in which the mobile device 100 is intended to operate. For example, a mobile device 100 intended to operate in a North American market may include a transceiver 411 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 419, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 419, other than any legally required operations, such as '911' emergency calling.

After any required network registration or activation procedures have been completed, the mobile device 100 may the send and receive communication signals, including both voice and data signals, over the networks 419. Signals received by the antenna 416 from the communication network 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the network 419 are processed, including modulation and encoding, for example, by the DSP 420 and are then provided to the transmitter 414 for digital to analog conversion, frequency up conversion, filtering, amplification and transmission to the communication network 419 via the antenna 418.

In addition to processing the communication signals, the DSP 420 also provides for transceiver control. For example, the gain levels applied to communication signals in the receiver 412 and the transmitter 414 may be adaptively controlled through automatic gain control algorithms implemented in the DSP 420. Other transceiver control algorithms could also be implemented in the DSP 420 in order to provide more sophisticated control of the transceiver 411.

The microprocessor 438 preferably manages and controls the overall operation of the mobile device 100. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, and a data communication application 424B may be stored in the non-volatile memory 424 for execution by the microprocessor 438. For example, the voice communication module 424A may provide a high-level user interface operable to transmit and receive voice calls between the mobile device 100 and a plurality of other voice or dual-mode devices via the network 419. Similarly, the data communication module 424B may provide a high-level user interface operable for sending and receiving data, such as e-mail messages, files, organizer information, short text messages, etc., between the mobile device 100 and a plurality of other data devices via the networks 419. The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Some of the subsystems shown in FIG. 4 perform communication-related functions, whereas other subsystems may provide "resident" or on-device functions. Notably, some subsystems, such as the keyboard 432 and the display 422 may be used for both communication-related functions, such as entering a text message for transmission over a data communication network, and device-resident functions such as a calculator or task list or other PDA type functions.

Operating system software used by the microprocessor 438 is preferably stored in a persistent store such as non-volatile memory 424. The non-volatile memory 424 may be implemented, for example, as a Flash memory component, or as battery backed-up RAM. In addition to the operating system, which controls low-level functions of the mobile device 410, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the mobile device 100. This interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the Flash memory 424.

Context objects representing at least partially decoded data items, as well as fully decoded data items, are preferably stored on the mobile device 100 in a volatile and non-persistent store such as the RAM 426. Such information may instead be stored in the non-volatile memory 424, for example, when storage intervals are relatively short, such that the information is removed from memory soon after it is stored. However, storage of this information in the RAM 426 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 330 of the mobile device 100 to the serial port of a computer system or device. The serial port 330 may also be used to enable a user to set preferences through an external device or software application, or to download other application modules 424N for installation. This wired download path may be used to load an encryption key onto the device, which is a more secure method than exchanging encryption information via the wireless network 419. Interfaces for other wired download paths may be provided in the mobile device 100, in addition to or instead of the serial port 330. For example, a USB port would provide an interface to a similarly equipped personal computer.

Additional application modules 424N may be loaded onto the mobile device 100 through the networks 419, through an auxiliary I/O subsystem 428, through the serial port 430, through the short-range communications subsystem 440, or through any other suitable subsystem 442, and installed by a user in the non-volatile memory 424 or RAM 426. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 411 and provided to the microprocessor 438, which preferably further processes the received signal in multiple stages as described above, for eventual output to the display 422, or, alternatively, to an auxiliary I/O device 428. A user of mobile device 100 may also compose data items, such as e-mail messages, using the keyboard 432, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 428, which may include a thumbwheel input device, a touchpad, a variety of switches, a rocker input switch, etc. The composed data items input by the user may then be transmitted over the communication networks 419 via the transceiver module 411.

When the mobile device 100 is operating in a voice communication mode, the overall operation of the mobile device is substantially similar to the data mode, except that received signals are preferably be output to the speaker 434 and voice signals for transmission are generated by a microphone 436. Alternative voice or audio I/O subsystems, such as a voice message recording subsystem, may also be implemented on the mobile device 100. Although voice or audio signal output is preferably accomplished primarily through the speaker 434, the display 422 may also be used to provide an indication of the identity of a calling party, the duration of a voice call, or other voice call related information. For example, the microprocessor 438, in conjunction with the voice communication module and the operating system software, may detect the caller identification information of an incoming voice call and display it on the display 422.

A short-range communications subsystem 440 is also included in the mobile device 100. The subsystem 440 may include an infrared device and associated circuits and components, or a short-range RF communication module such as a Bluetooth® module or an 802.11 module, for example, to provide for communication with similarly-enabled systems and devices. Those skilled in the art will appreciate that "Bluetooth®" and "802.11" refer to sets of specifications, available from the Institute of Electrical and Electronics Engineers, relating to wireless personal area networks and wireless local area networks, respectively.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method for providing authentication information from a client device to an authentication device, the method comprising:

generating, at the client device, a private key $K_{priv}$ associated with the client device, and a public key $K_{pub}$ paired to the private key $K_{priv}$;

transmitting $K_{pub}$ to the authentication device;

transmitting, to the authentication device, a first message comprising $K_{pub}$ and information derived from authentication data, the authentication data being associated with $K_{pub}$ and having been generated and stored by the authentication device, such that the authentication device can verify the first message using the information derived from the authentication data and, if said information is verified, store $K_{pub}$;

storing, at the client device, an encrypted private key $E_{Kpriv}$ comprising the private key $K_{priv}$ encrypted using a key K(P) derived from a previously provided password P, wherein the password P is unavailable for verification on the client device or the authentication device after storing the encrypted private key $E_{Kpriv}$ and prior to receiving an input password P' at the client device;

receiving the input password P' at the client device;

deriving, at the client device, a key K(P') from the input password P', wherein the key K(P') is derived from the input password P' using a same method used to derive the key K(P) from the previously provided password P;

applying a decryption algorithm, at the client device using the key K(P'), to the stored encrypted private key $E_{Kpriv}$ to provide a signing value;

in response to applying the decryption algorithm to the stored encrypted private key $E_{Kpriv}$, digitally signing a second message using the signing value; and transmitting the digitally signed second message to the authentication device, the authentication device being configured to verify a digital signature of the digitally signed second message using the paired public key $K_{pub}$, wherein when the authentication device fails to verify the digital signature of the digitally signed second message, a mismatch between the previously provided password P and the input password P' is detected.

2. The method of claim 1, wherein the authentication device, upon verifying the digital signature, is configured to deliver a digital certificate to the client device.

3. The method of claim 2, further comprising receiving, at the client device, the digital certificate upon verification of the digital signature by the authentication device.

4. The method of claim 3, wherein the authentication device comprises a server of a certificate authority.

5. The method of claim 1, wherein the key K(P) is a symmetric key derived from the previously provided password P and the key K(P') is a symmetric key derived from the input password P'.

6. The method of claim 1, wherein the client device comprises a communication device.

7. The method of claim 6, wherein the client device comprises a mobile communication device.

8. The method of claim 1, wherein the information derived from the authentication data comprises a message authentication code generated at the client device from the authentication data.

9. The method of claim 1, further comprising digitally signing the first message using $K_{priv}$.

10. The method of claim 1, wherein the second message digitally signed using the signing value comprises a predetermined message provided by the authentication device.

11. The method of claim 1, wherein the second message comprises a nonce or a randomly generated value.

12. A non-transitory computer-readable medium comprising instructions, which when executed by a processor of a client device, cause the client device to perform a method for providing authentication information from the client device to an authentication device, the method comprising:

generating, at the client device, a private key $K_{priv}$ associated with the client device, and a public $K_{pub}$ paired to the private key $K_{priv}$;

transmitting $K_{pub}$ to the authentication device;

transmitting, to the authentication device, a first message comprising $K_{pub}$ and information derived from authentication data, the authentication data being associated with $K_{pub}$ and having been generated and stored by the authentication device, such that the authentication device can verify the first message using the information derived from the authentication data and, if said information is verified, store $K_{pub}$;

storing, at the client device, an encrypted private key $E_{Kpriv}$ comprising the private key $K_{priv}$ encrypted using a key K(P) derived from a previously provided password P, wherein the password P is unavailable for verification on the client device or the authentication device after storing the encrypted private key $E_{Kpriv}$ and prior to receiving an input password P' at the client device;

receiving the input password P' at the client device;

deriving, at the client device, a key K(P') from the input password P', wherein the key K(P') is derived from the input password P' using a same method used to derive the key K(P) from the previously provided password P;

applying a decryption algorithm, at the client device using the key K(P'), to the stored encrypted private key $E_{Kpriv}$ to provide a signing value;

in response to applying the decryption algorithm to the stored encrypted private key $E_{Kpriv}$, digitally signing a second message using the signing value; and transmitting the digitally signed second message to the authentication device, the authentication device being configured to verify a digital signature of the digitally signed second message using the paired public key $K_{pub}$, wherein when the authentication device fails to verify the digital signature of the digitally signed second message, a mismatch between the previously provided password P and the input password P' is detected.

13. A client device for a system for authenticating the client device using an authentication device, the client device comprising:

a processor; and a memory;

wherein the processor is capable of causing the client device to provide authentication information from the client device to an authentication device, wherein the memory stores computer executable instructions that when executed by the processor configures the processor to:

generate, at the client device, a private key $K_{priv}$ associated with the client device, and a public key $K_{pub}$ paired to the private key $K_{priv}$;

transmit $K_{pub}$ to the authentication device;

transmit, to the authentication device a first message comprising $K_{pub}$ and information derived from authentication data, the authentication data being associated with $K_{pub}$ and having been generated and stored by the authentication device, such that the authentication device can verify the first message using the information derived from the authentication data and, if said information is verified, store $K_{pub}$;

store, in the memory at the client device, an encrypted private key $E_{Kpriv}$ comprising the private key $K_{priv}$ encrypted using a key K(P) derived from a previously provided password P, wherein the password P is unavailable for verification on the client device or the authentication device after storing the encrypted private key $E_{Kpriv}$ and prior to receiving an input password P' at the client device;

receive the input password P' at the client device;

derive, at the client device, a key K(P') from the input password P', wherein the key K(P') is derived from the input password P' using a same method used to derive the key K(P) from the previously provided password P;

apply a decryption algorithm, at the client device using the key K(P'), to the stored encrypted private key $E_{Kpriv}$ to provide a signing value;

digitally sign a second message using the signing value in response to applying the decryption algorithm to the stored encrypted private key $E_{Kpriv}$; and transmit the digitally signed second message to the authentication device, the authentication device being configured to verify a digital signature of the digitally signed second message using the paired public key $K_{pub}$, wherein when the authentication device fails to verify the digital signature of the digitally signed second message, a mismatch between the previously provided password P and the input password P' is detected.

14. The client device of claim 13, wherein the authentication device, upon verifying the digital signature, is configured to deliver a digital certificate to the client device.

15. The client device of claim 14, wherein the processor is further capable of causing the client device to receive, at the client device, the digital certificate upon verification of the digital signature by the authentication device.

16. The client device of claim 15, wherein the authentication device comprises a server of a certificate authority.

17. The client device of claim 13, wherein the key K(P) is a symmetric key derived from the previously provided password P and the key K(P') is a symmetric key derived from the input password P'.

18. The client device of claim 13, wherein the client device comprises a communication device.

19. The client device of claim 18, wherein the client device comprises a mobile communication device.

20. The client device of claim 13, wherein the information derived from the authentication data comprises a message authentication code generated at the client device from the authentication data.

21. The client device of claim 13, wherein the processor is further capable of digitally signing the first message using $K_{priv}$.

22. The client device of claim 13, wherein the second message digitally signed using the signing value comprises a predetermined message provided by the authentication device.

23. The client device of claim 13, wherein the second message comprises a nonce or a randomly generated value.

* * * * *